United States Patent
Mosko

(10) Patent No.: US 10,135,948 B2
(45) Date of Patent: Nov. 20, 2018

(54) SYSTEM AND METHOD FOR PROCESS MIGRATION IN A CONTENT CENTRIC NETWORK

(71) Applicant: CISCO TECHNOLOGY, INC., San Jose, CA (US)

(72) Inventor: Marc E. Mosko, Santa Cruz, CA (US)

(73) Assignee: Cisco Technology, Inc., San Jose, CA (US)

(*) Notice: Subject to any disclaimer, the term of this patent is extended or adjusted under 35 U.S.C. 154(b) by 167 days.

(21) Appl. No.: 15/339,116

(22) Filed: Oct. 31, 2016

(65) Prior Publication Data

US 2018/0124210 A1    May 3, 2018

(51) Int. Cl.
*H04L 29/08* (2006.01)
*H04L 29/06* (2006.01)

(52) U.S. Cl.
CPC ............. *H04L 67/34* (2013.01); *H04L 67/06* (2013.01); *H04L 67/10* (2013.01); *H04L 67/42* (2013.01)

(58) Field of Classification Search
CPC ......... H04L 67/06; H04L 67/10; H04L 67/34; H04L 67/42
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |

(Continued)

FOREIGN PATENT DOCUMENTS

| | | |
|---|---|---|
| CN | 103873371 | 6/2014 |
| DE | 1720277 A1 | 6/1967 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

Primary Examiner — Davoud A Zand

(57) ABSTRACT

One embodiment provides a system that facilitates a migration of a data model from a source device to a target device. During operation, the system generates, by a target device, a first interest for a first manifest which represents a version of the data model, wherein a manifest indicates a phase of the migration and a plurality of resources with corresponding names. The system transmits a first plurality of interests for the resources indicated in the first manifest based on a corresponding name. The system receives a second manifest, wherein the migration phase indicated in the second manifest is a stop-and-copy phase. The system transmits a second plurality of interests for the resources indicated in the second manifest based on a corresponding name. The system starts the data model on the system based on content objects retrieved in response to the first and second plurality of interests.

20 Claims, 10 Drawing Sheets

(56) References Cited

U.S. PATENT DOCUMENTS

| | | |
|---|---|---|
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |

(56) References Cited

U.S. PATENT DOCUMENTS

| | | |
|---|---|---|
| 9,280,610 B2 | 3/2016 | Gruber |
| 9,727,266 B2* | 8/2017 | Resch .................. G06F 3/0625 |
| 9,813,315 B2* | 11/2017 | Schultz ................ H04L 43/067 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0238050 A1 | 10/2005 | Pung |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0103896 A1 | 5/2008 | Flake |
| 2008/0107034 A1 | 5/2008 | Jetcheva |
| 2008/0107259 A1 | 5/2008 | Satou |
| 2008/0120129 A1* | 5/2008 | Seubert .................. G06Q 10/06 705/35 |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |

(56) References Cited

U.S. PATENT DOCUMENTS

| | | |
|---|---|---|
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |

(56) References Cited

U.S. PATENT DOCUMENTS

| | | |
|---|---|---|
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |
| 2016/0179618 A1* | 6/2016 | Resch .............. H04L 63/101 714/764 |
| 2016/0182319 A1* | 6/2016 | Martin .............. H04L 41/12 370/241 |
| 2018/0091590 A1* | 3/2018 | Olteanu .............. H04L 41/044 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |

(56) References Cited

FOREIGN PATENT DOCUMENTS

| | | |
|---|---|---|
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography-About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.

(56) References Cited

OTHER PUBLICATIONS

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

(56) References Cited

OTHER PUBLICATIONS

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

(56) References Cited

OTHER PUBLICATIONS

J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, "Paragraph [002]" "figure 1".
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] "paragraphs [003] - [006], [0011], [0013]" " figures 1,2".
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf "p. 5, col. 1" "p. 2, col. 1-2" " Section 4.1; p. 4, col. 2" "Section 4.2; p. 4, col. 2".
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.

* cited by examiner

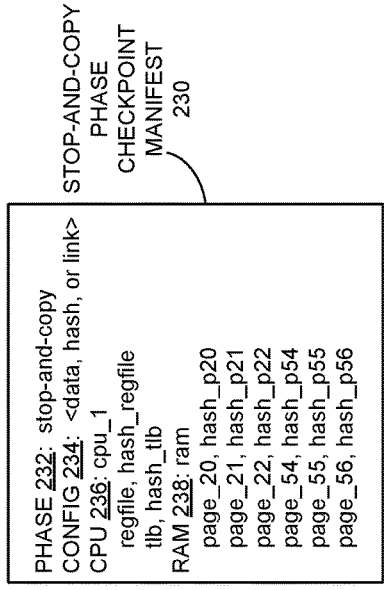
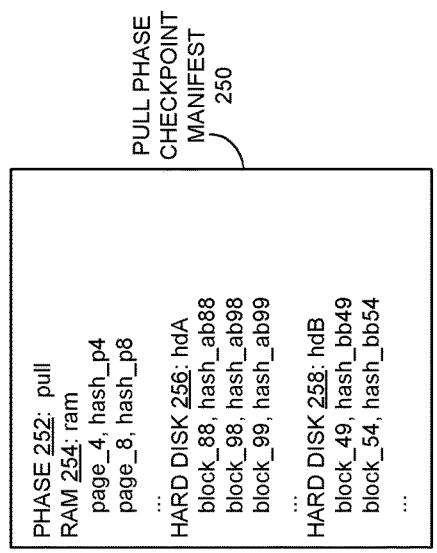
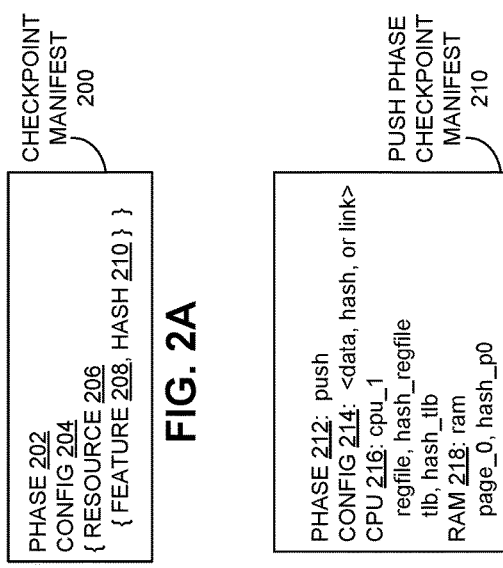

SYSTEM AND METHOD FOR PROCESS MIGRATION IN A CONTENT CENTRIC NETWORK

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and U.S. patent application Ser. No. 14/337,026, entitled "SYSTEM FOR DISTRIBUTING NAMELESS OBJECTS USING SELF-CERTIFYING NAMES," by inventor Marc E. Mosko, filed 21 Jul. 2014 (hereinafter "U.S. patent application Ser. No. 14/337,026");

the disclosures of which are herein incorporated by reference in their entirety.

BACKGROUND

Field

This disclosure is generally related to distribution of digital content. More specifically, this disclosure is related to a method and system for process migration in a content centric network based on a naming ontology and creation of checkpoint versions.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

A CCN data packet (such as an interest or content object) is routed based on its name. An interest can leave state in a pending interest table (PIT) as it travels through the network. A responsive content object can be cached by any intermediate node in its content store (CS). This caching creates efficient access to frequently requested data, because a subsequent interest for the same content can be satisfied by an intermediate node, rather than by an end host such as a content producer.

Process migration involves moving the running state of a process from one physical system to another, such as moving the state of a virtual machine from one system to another. While a CCN brings many desired features to a network, some issues remain unsolved in providing a system that facilitates process migration over a content centric network.

SUMMARY

One embodiment provides a system that facilitates a migration of a data model from a source device to a target device in a CCN. The system generates, by a target device, a first interest for a first manifest which represents a version of the data model, wherein a manifest indicates a phase of the migration and a plurality of machine resources with corresponding names. In response to receiving the first manifest, the system transmits a first plurality of interests for the resources indicated in the first manifest based on a name for a respective resource indicated in the first manifest. The system receives a second manifest, wherein the migration phase indicated in the second manifest is a stop-and-copy phase. The system transmits a second plurality of interests for the resources indicated in the second manifest based on a name for a respective resource indicated in the second manifest. The system starts the data model on the system based on content objects retrieved in response to the first and second plurality of interests, thereby facilitating the migration of the data model over a content centric network from a source device to the system. The system can be a target device.

In some embodiments, generating the first interest, receiving the first manifest, and transmitting the first plurality of interests are in response to determining a pre-copy method for the migration of the data model. Receiving the second manifest is in response to retrieving content indicated in the first manifest and one or more checkpoint manifests.

In some embodiments, a respective checkpoint manifest indicates a unique version identifier for the data model, the migration phase indicated in the first manifest and a respective checkpoint manifest is a push phase, and the second manifest represents a hot version of the data model.

In some embodiments, the data model comprises an architecture for a virtual machine, and the resources are resources of the virtual machine.

In some embodiments, a name is a hierarchically structured variable length identifier that includes contiguous name components ordered from a most general level to a most specific level. The name for a respective resource indicated in a manifest is a hash-based name which includes a hash value for data representing the respective resource. The hash-based name for the respective resource allows the system to obtain the respective resource from any device that stores a content object with a hash value that matches the hash value included in the hash-based name, thereby facilitating de-duplication of data in the data model.

In some embodiments, receiving the second manifest is further in response to the source device determining that a predetermined marginal threshold is reached and freezing the data model on the source device.

In some embodiments, the system receives a third manifest which represents a final version of the data model, wherein the migration phase indicated in the third manifest is a pull phase. The system transmits a third plurality of interests for the resources indicated in the third manifest based on a name for a respective resource indicated in the third manifest, wherein transmitting the third plurality of interests is based on a policy of the system.

In some embodiments, the system transmits a first interest which is a close checkpoint message with a name that indicates a respective manifest. in response to receiving an acknowledgment of the first interest, the system transmits a second interest which is a confirm checkpoint close message with a name that indicates the respective manifest. The system receives an acknowledgment of the second interest, wherein the source device releases the resources indicated in the respective manifest.

Another embodiment provides a system for facilitating a migration of a data model indicating resources. The system generates a first manifest which represents a version of the data model, wherein a manifest indicates a phase of the migration and a plurality of resources with corresponding names. In response to receiving a first plurality of interests for the resources indicated in the first manifest based on a name for a respective resource indicated in the first manifest, the system transmits a first plurality of corresponding content objects. In response to reaching a predetermined threshold, the system: freezes the data model on the system; and generates a second manifest, wherein the migration phase indicated in the second manifest is a stop-and-copy phase. In response to receiving a second plurality of interests for the resources indicated in the second manifest based on a name for a respective resource indicated in the second manifest, the system transmits a second plurality of corresponding content objects, thereby facilitating the migration of the data model over a content centric network from the system to a target device. The system can be a source device.

In some embodiments, generating the first manifest, receiving the first plurality of interests, and transmitting the first plurality of content objects are in response to determining a pre-copy method for the migration of the data model, wherein the migration phase indicated in the first manifest is a push phase.

In some embodiments, the system generates one or more checkpoint manifests. A respective checkpoint manifest indicates a unique version identifier for the data model, the migration phase indicated in the respective checkpoint manifest is a push phase, and the second manifest represents a hot version of the data model.

In some embodiments, the system generates a third manifest which represents a final version of the data model, wherein the migration phase of the third manifest indicates a pull phase. In response to receiving a third plurality of interests for the resources indicated in the third manifest based on a name for a respective resource indicated in the third manifest, the system transmits a third plurality of corresponding content objects.

In some embodiments, in response to receiving a first interest which is a close checkpoint message with a name that indicates a respective manifest, the system transmits an acknowledgment of the first interest. In response to receiving a second interest which is a confirm checkpoint close message with a name that indicates the respective manifest, the system: transmits an acknowledgment of the second interest; and releases the resources indicated in the respective manifest.

BRIEF DESCRIPTION OF THE FIGURES

FIG. 2A illustrates an exemplary format for a checkpoint manifest, in accordance with an embodiment of the present invention.

FIG. 2B illustrates an exemplary push phase checkpoint manifest, in accordance with an embodiment of the present invention.

FIG. 2C illustrates an exemplary stop-and-copy phase checkpoint manifest, in accordance with an embodiment of the present invention.

FIG. 2D illustrates an exemplary pull phase checkpoint manifest, in accordance with an embodiment of the present invention.

In the figures, like reference numerals refer to the same figure elements.

DETAILED DESCRIPTION

Figure 1:
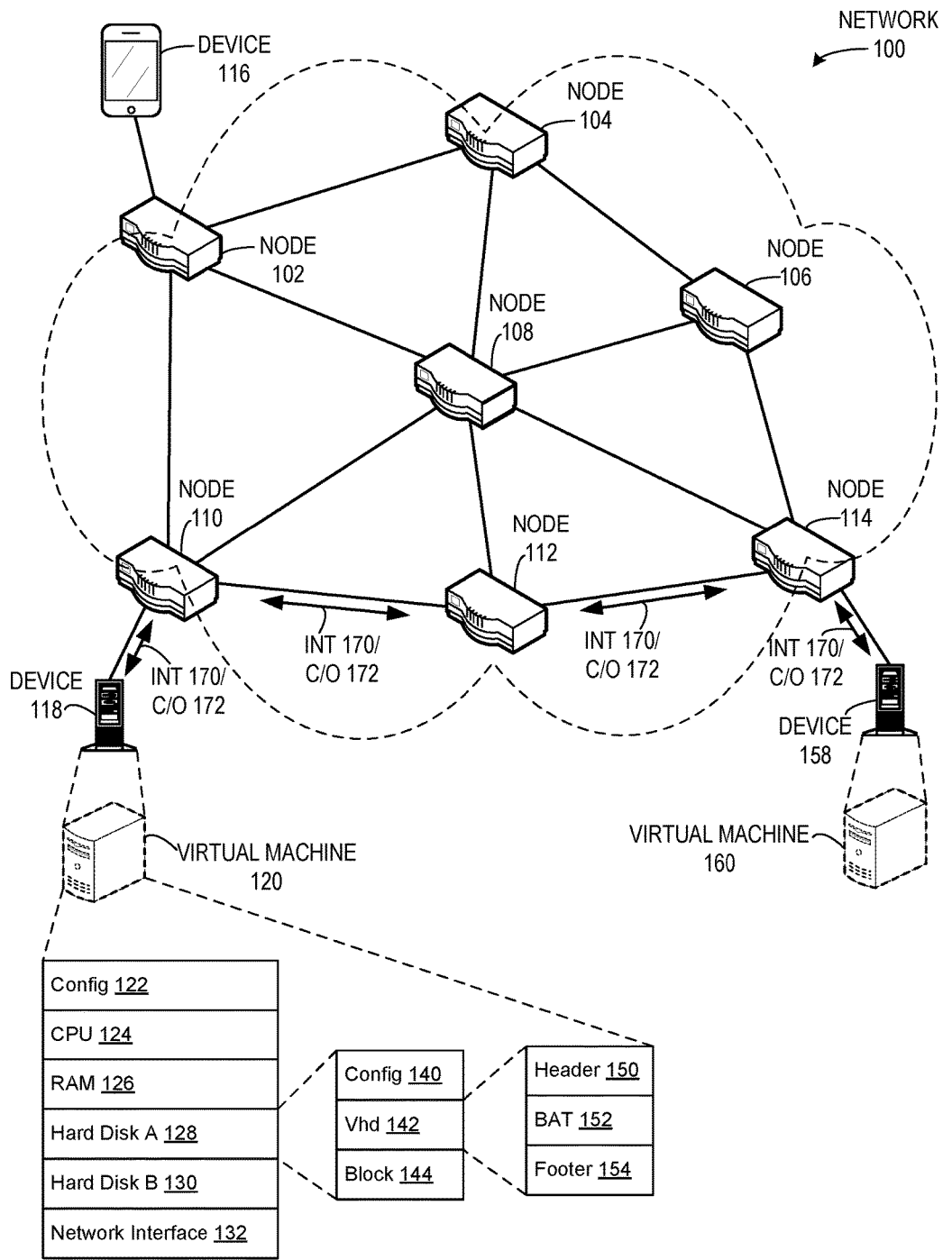
FIG. 1 illustrates an exemplary network which facilitates process migration in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates process migration in a content centric network based on a naming ontology and named checkpoint versions. A CCN data packet (such as an interest or content object) is routed based on its name. An interest can leave state in a pending interest table (PIT) as it travels through the network. A responsive content object can be cached by any intermediate node in its content store (CS). This caching creates efficient access to frequently requested data, because a subsequent interest for the same content can be satisfied by an intermediate node, rather than by an end host such as a content producer.

Process migration can include moving the state of a virtual machine from one physical system (i.e., a source device) to another physical system (i.e., a target device). One technique for progress migration is the pre-copy method, which involves three phases: the push phase; the stop-and-copy phase; and the pull phase, as described in Clark, et al., "Live migration of virtual machines," Proceedings of the 2$^{nd}$ Conference on Symposium on Networked Systems Designs & Implementation, Vol. 2, pages 273-286, USENIX Association, 2005. In the push phase, slowly changing state is moved over the network, possibly in several rounds. In the stop-and-copy phase, the source virtual machine freezes, and the hot state is moved over the network. In the pull phase, any remaining data not copied over is moved over the network (e.g., the target can "lazily" pull the data on-demand or at its desired pace).

Another technique for process migration is the post-copy method, whereby the source first freezes the virtual machine and transfers the CPU state (similar to the stop-and-copy phase of the pre-copy method), and then transfers the memory (similar to both the push and pull phases of the pre-copy method), as described in Hines, et al., "Post-copy based live virtual machine migration using adaptive pre-paging and dynamic self-ballooning," Proceedings of the 2009 ACM SIGPLAN/SIGOPS International Conference on Virtual Execution Environments, pages 51-60, ACM, 2009. Other process migration techniques are possible, including the Remus hot migration, which uses consistent and frequent checkpoints for hot-spare virtual machine migration, as described in Cully, et al., "Remus: High availability via asynchronous virtual machine replication," Proceedings of the 5$^{th}$ USENIX Symposium on Networked Systems Design and Implementation, pages 161-174, San Francisco, 2008.

Embodiments of the present invention provide a system based on the pre-copy process migration technique which facilitates process migration over a CCN by mapping machine elements to CCN names. The system uses hash-based formatted names and manifests via CCN interests and content objects to identify, represent, and move the machine resources. Hash-based names (i.e., nameless content objects) are described in U.S. patent application Ser. No. 14/337,026. The system includes strong checkpointing and data de-duplication. The system creates named checkpoint manifests in the three phases of the pre-copy technique, where a named checkpoint corresponds to a specific version of a machine model. Exemplary checkpoint manifests are described below in relation to FIGS. 2A-2D, and an exemplary communication that facilitates process migration in a CCN based on formatted names is described below in relation to FIGS. 3A and 3B.

Thus, the present system provides improvements to the distribution of digital content, where the improvements are fundamentally technological. Embodiments of the present invention provide a technological solution (e.g., facilitating process migration over a CCN based on a pre-copy method using interest/content object exchanges and manifests) to the technological problem of efficiently migrating a process, such as a data model or a virtual machine, over a CCN.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is herein incorporated by reference.

A Classic Machine Model and Exemplary Formatted Names

A classic machine model includes a central processing unit (CPU) with a register file, random access memory (RAM), permanent storage (e.g., hard disks), and accessories (e.g., network interface cards or a graphics system), as well as a configuration file describing the system architecture. The machine model (or any data model) and its constituent resources can be mapped to names and corresponding content objects. The configuration file can specify the hardware parameters, including the number of CPUs (including identifiers, e.g., where "cpu_n," is the nth CPU), the amount of RAM and the page size (e.g., 1 GB with 4 KB pages), the number of hard disks (including identifiers, e.g., "hdA" and "hdB"), and network interfaces (e.g., "en0"). A hard disk may be represented in the Virtual Hard Disk ("vhd") format and includes its own configuration file in addition to data blocks (e.g., 512 bytes or 4 KB, per the configuration file). A standard disk model, such as vhd, uses three control structures in addition to the data blocks: a dynamic disk header; a block allocation table (BAT); and a disk footer. The CCN naming ontology maps each machine element or resource to a CCN name. Below are exemplary names for resources of a virtual machine with a routable prefix or identifier of "/vm-name," n CPUs, x pages of RAM, two hard disks (hdA and hdB, where at least hdA is of the vhd format) each with y blocks, and a network interface of en0:

/vm-name/config Format (1)
/vm-name/cpu/\{0 . . . cpu_n\}regfile Format (2)
/vm-name/cpu/\{0 . . . cpu_n \}/tlb Format (3)
/vm-name/ram/page/{0 . . . ram_x} Format (4)
/vm-name/disk/hda/config Format (5)
/vm-name/disk/hda/vhd/header Format (6)
/vm-name/disk/hda/vhd/bat Format (7)
/vm-name/disk/hda/vhd/footer Format (8)
/vm-name/disk/hda/block/{0 . . . hda_y} Format (9)
/vm-name/disk/hdb/config Format (10)
/vm-name/disk/hdb/block/{0 . . . hdb_y} Format (11)
/vm-name/net/en0 Format (12)

Process Migration Using Pre-Copy Technique and Hash-Based Names

The following assumptions may be made: A supervisory process determines the need to begin a migration process, i.e., to move a process from a source or source device to a target or target device. The supervisory process can instantiate a process duplicator agent on each of the source and the target, such as in the virtual machine hypervisor. Furthermore, the agents have a reliable transfer method, and the source and the target can agree on a window size or acknowledgment mechanism so that the source can release resources which have been correctly transferred to the target. Finally, the source and the target have a reliable close mechanism, such as the four-way handshake described below in relation to FIG. 5.

The system can facilitate process migration over a CCN based on the three phases of the pre-copy technique and the specific naming ontology. In the push phase, the source creates versioned checkpoint manifests, which are pulled by the target. The target then retrieves the data represented in the checkpoint manifest via the naming ontology. The source and the target iterate through the push phase until the source determines a marginal benefit. In the stop-and-copy phase, the source freezes the data model (e.g., the virtual machine), creates a next checkpoint manifest of critical resources, and transfers the next checkpoint manifest to the target. Finally, in the pull phase, the source creates a final checkpoint manifest, which the target can lazily pull as needed. This three-phase process, along with hash-based formatted names following the naming ontology, is described below in the exemplary communications of FIGS. 3A and 3B.

The naming ontology follows the formatted names described above for the exemplary machine model. For example, in the push phase, a checkpoint manifest can have a name such as "/vm-name/checkpoint/ver=j/manifest" while a resource represented in the checkpoint manifest can be retrieving using a hash-based name. For example, an interest for the resource can have a name of "/vm-name/checkpoint/ver=j/resource=ram/feature=page_1/hash=hash_p1" or "/vm-name/chkpt/ver=0/ram/page_1/hash_p1." Exemplary checkpoint manifests are described below in relation to FIGS. 2A-2D.

Exemplary Network

FIG. 1 illustrates an exemplary network 100 which facilitates process migration in a content centric network, in accordance with an embodiment of the present invention. Network 100 can include a consumer or content requesting device 116, producers or content producing devices 118 and 120, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 110, and 114) or a core router (e.g., intermediate CCN routers 106, 108, and 112). Network 100 can be a content centric network. Device 118 can be a source device, and device 158 can be a target device. Source device 118 can run a virtual machine 120, which can include the following components or resources: a configuration file 122; a CPU 124; a RAM 126; a hard disk A 128; a hard disk B 130; and a network interface 132. Hard disk A 128 can be of a vhd format, and can include a configuration file 140, a vhd 142, and a block 144. While only one block 144 is depicted in FIG. 1, hard disk A 128 can include multiple blocks. Vhd 144 can include a header 150, a BAT 152, and a footer 154. Target device 158 can run a virtual machine 160 with similar resources (not shown) as virtual machine 120 running on source device 118. Source device 118 and target device 158 can participate in a migration process, which involves moving the state of virtual machine 120 from source device 118 to (virtual machine 160) on target device 158.

During operation, target device 158 can communicate with source device 118 by sending an interest 170 which travels through network 100 via nodes 114, 112, and 110 before reaching source device 118. Source device 118 can satisfy interest 170 and return a responsive content object 172. For example, interest 170 can be an interest for a checkpoint manifest which represents a version of the data model for virtual machine 120, and content object 172 can be the responsive checkpoint manifest. A name for interest 170 (and responsive content object 172 can be "/vm-name/checkpoint/ver=0/manifest." The manifest can indicate the phase of the process migration (e.g., push, stop-and-copy, or pull) as well as the resources with corresponding names, including hash-based names.

Upon receiving the manifest, target device 158 can generate interests for the indicated resources using the corresponding hash-based names. Target device 158 can retrieve the corresponding content objects from source device 118 or from any intermediate node that may have a cached copy of the corresponding content objects. For example, node 112 may store a cached copy of a content object with a name of "/vm-name/checkpoint/ver=0/ram/page_1/hash_p1," that is, a content object whose hash is equal to "hash_p1" as included in the name of the respective interest. Thus, intermediate node 112 can return a responsive content object 172 to target device 158. The caching features of a CCN also result in de-duplication, which is described in detail below. A detailed description of the push, stop-and-copy, and pull phases in a process migration over a CCN is described below in relation to FIGS. 3A and 3B.

Exemplary Versioned Checkpoint Manifests

FIG. 2A illustrates an exemplary format for a checkpoint manifest 200, in accordance with an embodiment of the present invention Checkpoint manifest 200 can indicate a phase 202, a configuration 204, and a list of resources 206, where a resource can include one or more tuples comprised of a feature 208 and a hash 210.

FIG. 2B illustrates an exemplary push phase checkpoint manifest 210, in accordance with an embodiment of the present invention. Manifest 210 can indicate a phase 212 with a value of "push," a configuration file 214 with a value of "<data, hash, or link>," a CPU 216 resource with a value of "cpu_1," a RAM 218 resource with a value of "ram," a hard disk 220 resource with a value of "hdA," and a hard disk 222 resource with a value of "hdB." CPU 212 can include the following {feature, hash} tuples: {regfile, hash_regfile}; and {tlb, hash_tlb}. RAM 218 can indicate the following {feature, hash} tuples: {page_0, hash_p0}; {page_1, hash_p1}; and {page_2, hash_p2}. Hard disk 220 can indicate the following {feature, hash} tuples: {config_A, hash_configA}; {vhd/header, hash_vhdr}; {vhd/bat, hash_vbat}; {vhd/footer, hash_vftr}; {block_0, hash_ab0}; {block_1, hash_ab1}; and {block_2, hash_ab2}. Hard disk 222 can indicate the following {feature, hash} tuples: {config_B, hash_configB}; {block_0, hash_bb0}; {block_1, hash_bb1}; and {block_2, hash_bb2}.

FIG. 2C illustrates an exemplary stop-and-copy phase checkpoint manifest 230, in accordance with an embodiment of the present invention. Manifest 230 can indicate a phase 232 with a value of "stop-and-copy," a configuration file 234 with a value of "<data, hash, or link>," a CPU 236 resource with a value of "cpu_1," and a RAM 238 resource with a value of "ram." CPU 236 can indicate the following {feature, hash} tuples: {regfile, hash_regfile}; and {tlb, hash_tlb}. CPU 236 can also indicate other essential CPU state in stop-and-copy checkpoint manifest 230. RAM 238 can indicate the following {feature, hash} tuples: {page_20, hash_p20}; {page_21, hash_p21}; {page_22, hash_p22}; {page_54, hash_p54}; {page_55, hash_p55}; and {page_56, hash_p56}. RAM 238 can also indicate other high turnover pages in stop-and-copy manifest 230.

FIG. 2D illustrates an exemplary pull phase checkpoint manifest 250, in accordance with an embodiment of the present invention. Manifest 250 can indicate a phase 252 with a value of "pull," a RAM 254 resource with a value of "ram," a hard disk 256 resource with a value of "hdA," and a hard disk 258 resource with a value of "hdB." RAM 254 can indicate the following {feature, hash} tuples: {page_4, hash_p4}; and {page_8, hash_p8}. Hard disk 256 can indicate the following {feature, hash} tuples: {block_88, hash_ab88}; {block_98, hash_ab98}; and {block_99, hash_ab99}. Hard disk 258 can indicate the following {feature, hash} tuples: {block_49, hash_bb49}; and {block_54, hash_bb54}.

Each of checkpoint manifest 200, push phase checkpoint manifest 210, stop-and-copy phase manifest 230, and pull phase checkpoint manifest 250 can also include a name and a version field (not shown). Each resource indicated in a manifest can be retrieved by generating an interest with a name in the format of, e.g., Formats (1)-(12), where a last name component is the corresponding hash value for the resource or the specific feature of the resource. A responsive content object with the same name as the interest is thus retrieved by (and transferred to) the target device. For example, an interest with a name of "/vm-name/checkpoint/ver=15/ram/page_1/hash_p1" will return a content object with the same name. Chunk numbers may also be used when a content object representing a resource is larger in size than a single content object. In this case, the interest name can be, e.g., "/vm-name/checkpoint/ver=15/chunk=k/ram/page_1/hash_p1."

Exemplary Communication Facilitating Process Migration over a CCN

Figure 3A:
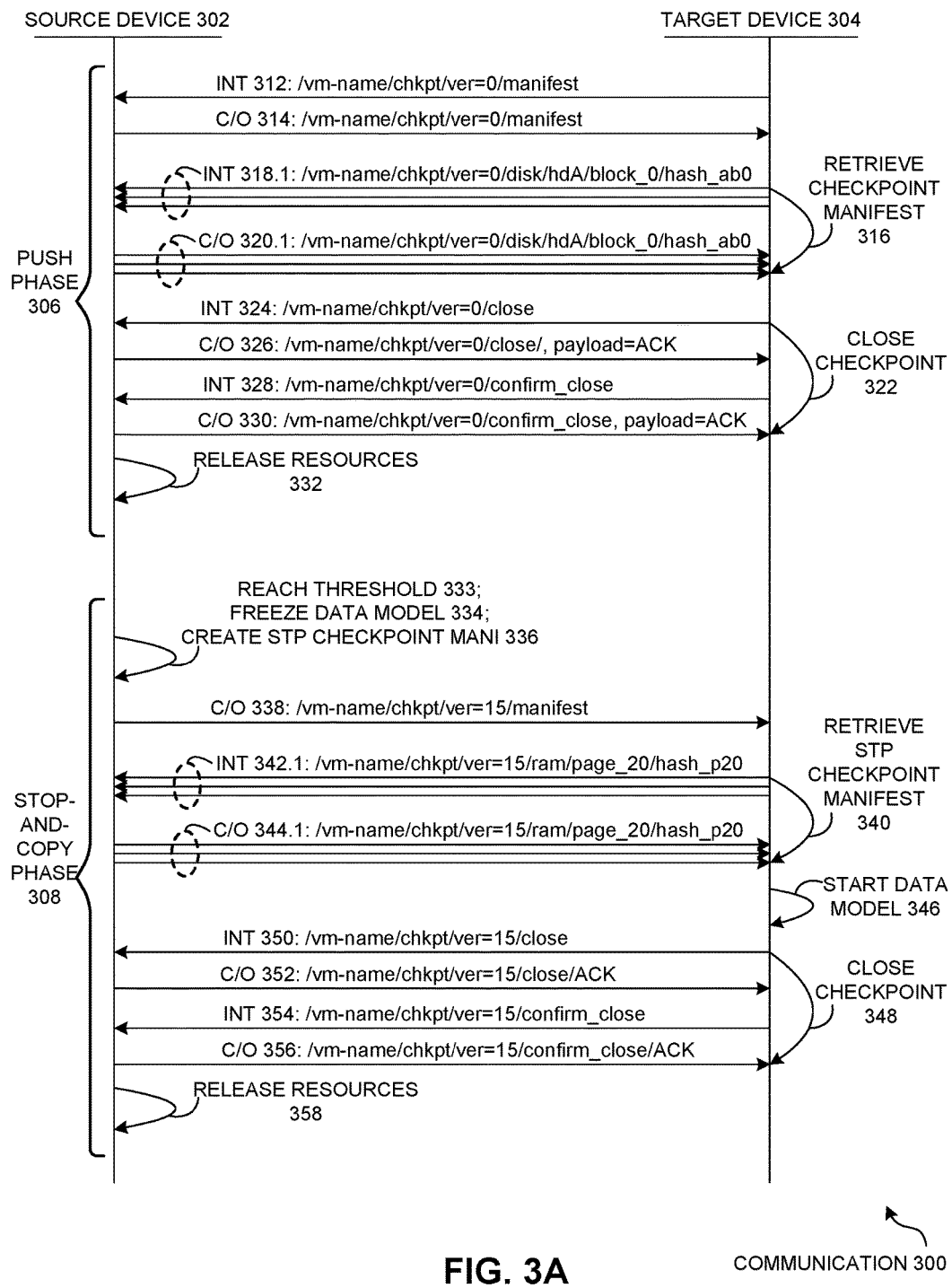
FIG. 3A illustrates an exemplary communication which facilitates process migration in a content centric network, in accordance with an embodiment of the present invention.

FIG. 3A illustrates an exemplary communication 300 which facilitates process migration in a content centric network, in accordance with an embodiment of the present invention. Communication 300 includes a source or source device 302 and a target or target device 304, which can communicate over a network such as a CCN. A supervisory process can determine the need to migrate a data model (such as a process like a virtual machine model) from source 302 to target 304. Target 304 and source 302 can participate in a push phase 306, a stop-and-copy phase 308, and a pull phase 310 (in FIG. 3B).

Target 304 can generate an interest 312 with a name of "/vm-name/chkpt/ver=0/manifest," which represents a version of the data model. In some embodiments, version 0 indicates an initial image of the data model. Source 302 can generate and return a responsive content object 314 with the same name as the interest name. Content object 314 can be, e.g., push phase checkpoint manifest 210 of FIG. 2B.

Target 304 can retrieve the checkpoint manifest (function 316), which involves transmitting a plurality of interests for the resources indicated in the checkpoint manifest. Each interest has a name which indicates the resource and can include a specific feature and corresponding hash value. For example, target 304 can generate an interest 318.1 with a name of "/vm-name/chkpt/ver=0/disk/hdA/block_0/hash_ab0" and receive a responsive content object 320.1 with the same name and which includes as its payload the data corresponding to the specific resource.

Upon retrieving all the content objects indicated in manifest 314, target 304 can close the checkpoint (function 322), which involves a four-way handshake. Target 304 can send an interest 324 with a name of "/vm-name/checkpt/ver=0/close" and receive from source 302 a responsive ACK content object 326 with the same name. The ACK can be indicated in a payload of content object 326 or in another field. Target 304 can then send an interest 328 with a name of "/vm-name/chkpt/ver=0/confirm_close" and receive from source 302 a responsive ACK content object 330 with the same name. Interest 324 can be a close checkpoint message, and interest 328 can be a confirm checkpoint close message. Source 302 can release the resources (function 332) associated with the respective manifest (i.e., version 0 of the checkpoint manifest). Target 304 and source 302 can iterate through push phase 306 until source 302 determines that a predetermined marginal threshold is reached (function 333) (i.e., transferring a push checkpoint manifest only results in a marginal benefit).

Upon making this determination, source 302 can freeze the data model on source 302 (function 334) and create a stop-and-copy ("stp") checkpoint manifest (function 336). Source 302 can send a content object 338 which is an stp checkpoint manifest with a name of, e.g., "/vm-name/chkpt/ver=15/manifest." In some embodiments, source 302 sends content object 338 in response to an interest (from target 304) with the same name as the content object name. Content object 314 can be, e.g., stop-and-copy phase checkpoint manifest 230 of FIG. 2C.

Target 304 can retrieve the stp checkpoint manifest (function 340), which involves transmitting a plurality of interests for the resources indicated in the stp checkpoint manifest. Each interest has a name which indicates the resource and can include a specific feature and corresponding hash value. For example, target 304 can generate an interest 342.1 with a name of "/vm-name/chkpt/ver=15/ram/page_20/hash_p20" and receive a responsive content object 344.1 with the same name and which includes as its payload the data corresponding to the specific resource.

Upon retrieving all the content objects indicated in manifest 338, target 304 can start the data model on target 304 (function 346) and close the checkpoint (function 348), which involves the four-way handshake described above and applied to interest 350, content object 352, interest 354, and content object 356. Source 302 can release the resources (function 338) associated with the respective manifest (i.e., version 15 of the checkpoint manifest, or the stp checkpoint manifest).

Figure 3B:
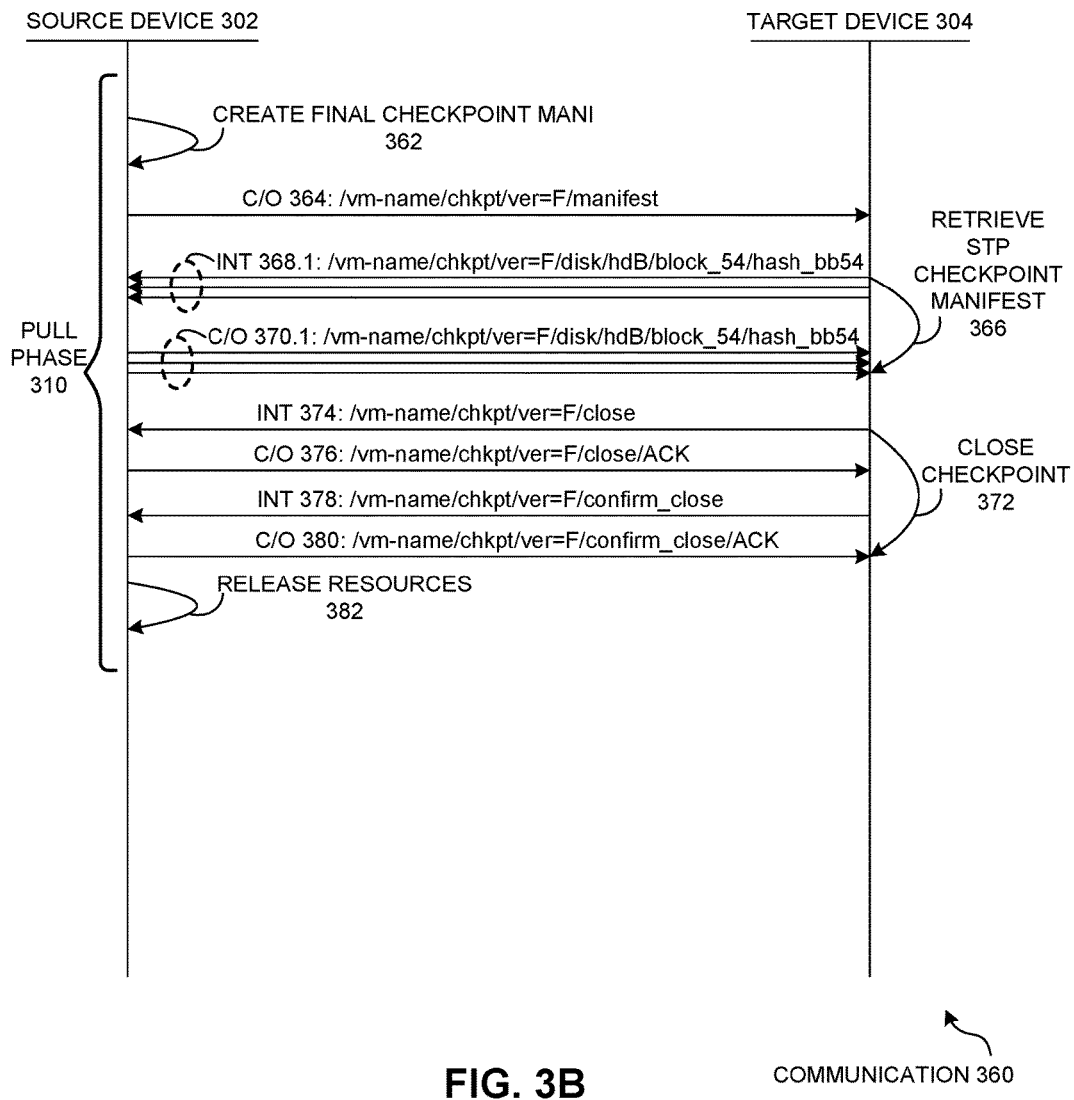
FIG. 3B illustrates an exemplary communication which facilitates process migration in a content centric network, in accordance with an embodiment of the present invention.

FIG. 3B illustrates an exemplary communication 360 which facilitates process migration in a content centric network, in accordance with an embodiment of the present invention. Subsequent to the communications described in FIG. 3A, source 302 can create a final checkpoint manifest 362. Source 302 can send a content object 364 which is a final checkpoint manifest with a name of, e.g., "/vm-name/chkpt/ver=F/manifest." In some embodiments, source 302 sends content object 364 in response to an interest (from target 304) with the same name as the content object name. The version "F" refers to a final version, and can also be a version number or identifier greater than the version number or identifier for the previously transferred manifest. Content object 364 can be, e.g., pull phase checkpoint manifest 250 of FIG. 2D.

Target 304 can retrieve the final checkpoint manifest (function 366), which involves transmitting a plurality of interests for the resources indicated in the final manifest. Each interest has a name which indicates the resource and can include a specific feature and corresponding hash value. For example, target 304 can generate an interest 368.1 with a name of "/vm-name/chkpt/ver=F/disk/hdB/block_54/hash_bb54" and receive a responsive content object 370.1 with the same name and which includes as its payload the data corresponding to the specific resource. Because the most crucial information has already been transferred to target 304 (in stop-and-copy phase 308), and because the data model is already running on target 304, target 304 can perform function 366 on demand (i.e., a "lazy" pull at a pace of its choosing).

Upon retrieving all the content objects indicated in manifest 364, target 304 can close the checkpoint (function 372), which involves the four-way handshake described above and applied to interest 374, content object 376, interest 378, and content object 380. Source 302 can release the resources (function 382) associated with the respective manifest (i.e., version F of the checkpoint manifest, or the final checkpoint manifest).

Thus, communications 300 and 360 illustrate how the system facilitates process migration over a CCN, based on the three phases of the pre-copy technique, and further based on standard CCN interest and content object packets with hash-based formatted names. Other process migration techniques are possible, including the post-copy technique and the Remus hot migration technique.

How Nameless Content Objects Facilitate De-Duplication

De-duplication is a technique where only one copy of data exists and the one copy is shared between multiple instances. In CCN, resources can be de-duplicated and shared both within and between virtual machine instances. For example, two disk blocks that have the same hash value refer to the same content object. In this case, only the block index in the manifest is different.

A virtual machine hypervisor may also share blocks between virtual machines. When generating the names used to retrieve content indicated in a checkpoint manifest, the source migration agent running in the source hypervisor can use a name such as "/nyc/host/hash=0x6333" so that any instance or any component can share the same data. If the size of a memory page and the size of a disk block are the same, the data or content object with this name can be both a disk block and a RAM page of the same data (e.g., a shared library code section). The checkpoint manifest can point to different names prefixes for each hash value, and can indicate the virtual resource corresponding to the hash value. Thus, the same physical bytes may be used for many purposes.

As an example, a migration agent may know that some disk blocks are common. The hard disk hdA can mount a read-only root file system that only contains common operating system and application binary resources. These may be associated with a name prefix such a "/nyc/objectstore" and may be shared over many different physical hosts. The checkpoint manifest allows these resources to come from the specific name prefix and also allow other resources to come from a host-specific or virtual machine-specific location. Thus, the system allows for de-duplication of data based on the CCN naming ontology and further based on retrieval of content from both cached copies and varying prefix-based locations.

Routing and Control Channel

The system can manage routing in several ways. We assume that all systems have a unique name (e.g., "/nyc/host7/vm-name") possibly in addition to a generic name (e.g., "/vm-name"). Three routing models are possible. The first routing model is the external model, where an external agency or agencies manage the routing namespace. One example is a typical CCN interest. In the external model, the source and target migration agents can have different names. The source may have the name prefix "/nyc/host7/vm-name" and the target may have the name prefix "/sfo/host2/vm-name." A migration orchestrator (e.g., a supervisory process) can understand these names and appropriately instruct the migration agents of the correct names.

The second routing model is the software-defined model, where a central but programmable agency manages the routing namespace, such as a software-defined network environment. In the software-defined model, generic names such as "/vm-name" may be used. Prior to and during the stop-and-copy phase, the name points to the source agent. After the stop-and-copy phase, when the target is ready to start the data model or virtual machine, the target notifies the network controller to point "vm-name" to the target. This leaves the source with only its location-dependent name, "/nyc/host7/vm-name," which is used in the pull phase to transfer any remaining data.

The third routing model is the distributed model, where the endpoints manage the routing namespace, e.g., by running a secure routing process. In the distributed model, the source agent advertises "/vm-name" until the completion of the stop-and-copy phase. After this point, the source agent stops advertising the name, and the destination agent begins advertising the name. The destination may then finish transferring data in the pull phase using the location-dependent name of the source agent, e.g., "/nyc/host7/vm-name."

CCNx routing can be set up such that "/vm-name" points to the correct location of the source system. The target agent can poll the source agent until the source agent is running, and the target agent can then request the first checkpoint (e.g., by issuing interest 312 in FIG. 3A). After a specific checkpoint is transferred, the target agent can pull the next checkpoint version (e.g., by iterating through push phase 306 of FIG. 3A).

Recall that each checkpoint manifest indicates the phase (or purpose) of the manifest (i.e., push, stop-and-copy, or pull). The target thus knows to keep its data model (or virtual machine) frozen while receiving a push phase manifest and retrieving the indicated content. The target also knows to start the data model after receiving the stop-and-copy phase manifest and retrieving the indicated content. Upon starting the data model, the target also knows to retrieve the final manifest for the next checkpoint version, which is the remaining uncopied data which the target agent can subsequently pull or retrieve at its leisure.

Target Device Facilitates Process Migration Over a CCN

Figure 4A:
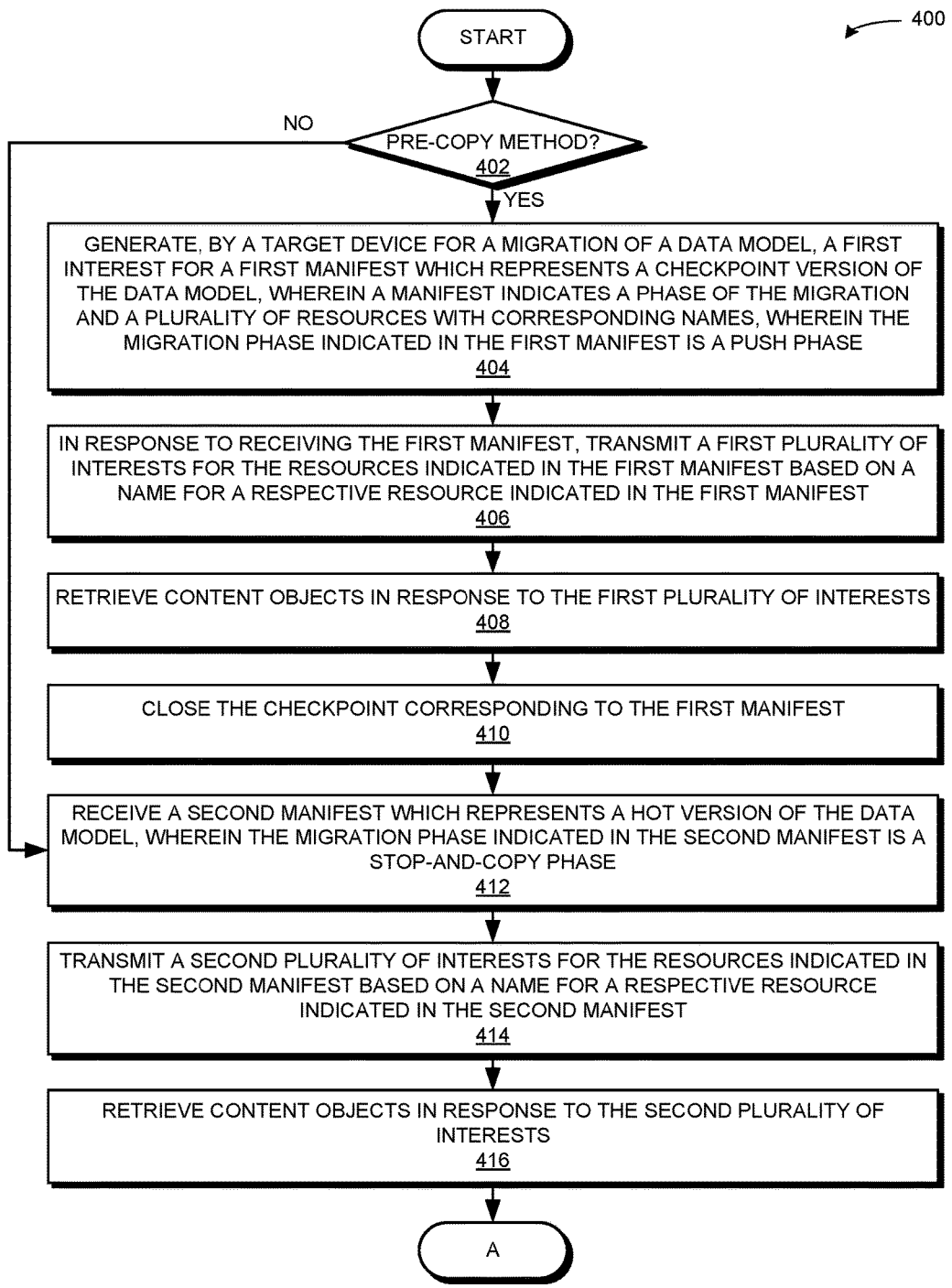
FIG. 4A presents a flow chart illustrating a method by a target device for facilitating process migration in a content centric network, in accordance with an embodiment of the present invention.

FIG. 4A presents a flow chart 400 illustrating a method by a target device for facilitating process migration in a content centric network, in accordance with an embodiment of the present invention. During operation, a target device determines whether a pre-copy method is used for a migration of a data model (decision 402). If the pre-copy method is not being used, and another method such as a post-copy method is being used, the operation continues at operation 412. If the pre-copy method is being used, the target device generates a first interest for a first manifest which represents a checkpoint version of the data model, wherein a manifest indicates a phase of the migration and a plurality of resources with corresponding names, wherein the migration phase indicated in the first manifest is a push phase (operation 404). In response to receiving the first manifest, the target device transmits a first plurality of interests for the resources indicated in the first manifest based on a name for a respective resource indicated in the first manifest (operation 406). The target device retrieves content objects in response to the first plurality of interests (operation 408). The target device closes the checkpoint corresponding to the first manifest (operation 410, and as described below in relation to FIG. 5).

The target device receives a second manifest which represents a hot version of the data model, wherein the migration phase indicated in the second manifest is a stop-and-copy phase (operation 412). Receiving the second manifest is in response to the source device reaching a predetermined threshold (i.e., determining that marginal benefits result from transferring a checkpoint manifest, as in function 333 of FIG. 3A). Receiving the second manifest is further in response to the source device freezing the data model on the source device (as in function 334 of FIG. 3A). In response to receiving the second manifest, the target device transmits a second plurality of interests for the resources indicated in the second manifest based on a name for a respective resource indicated in the second manifest (operation 414). The target device retrieves content objects in response to the second plurality of interests (operation 416), and the operation continues at Label A of FIG. 4A.

Figure 4B:
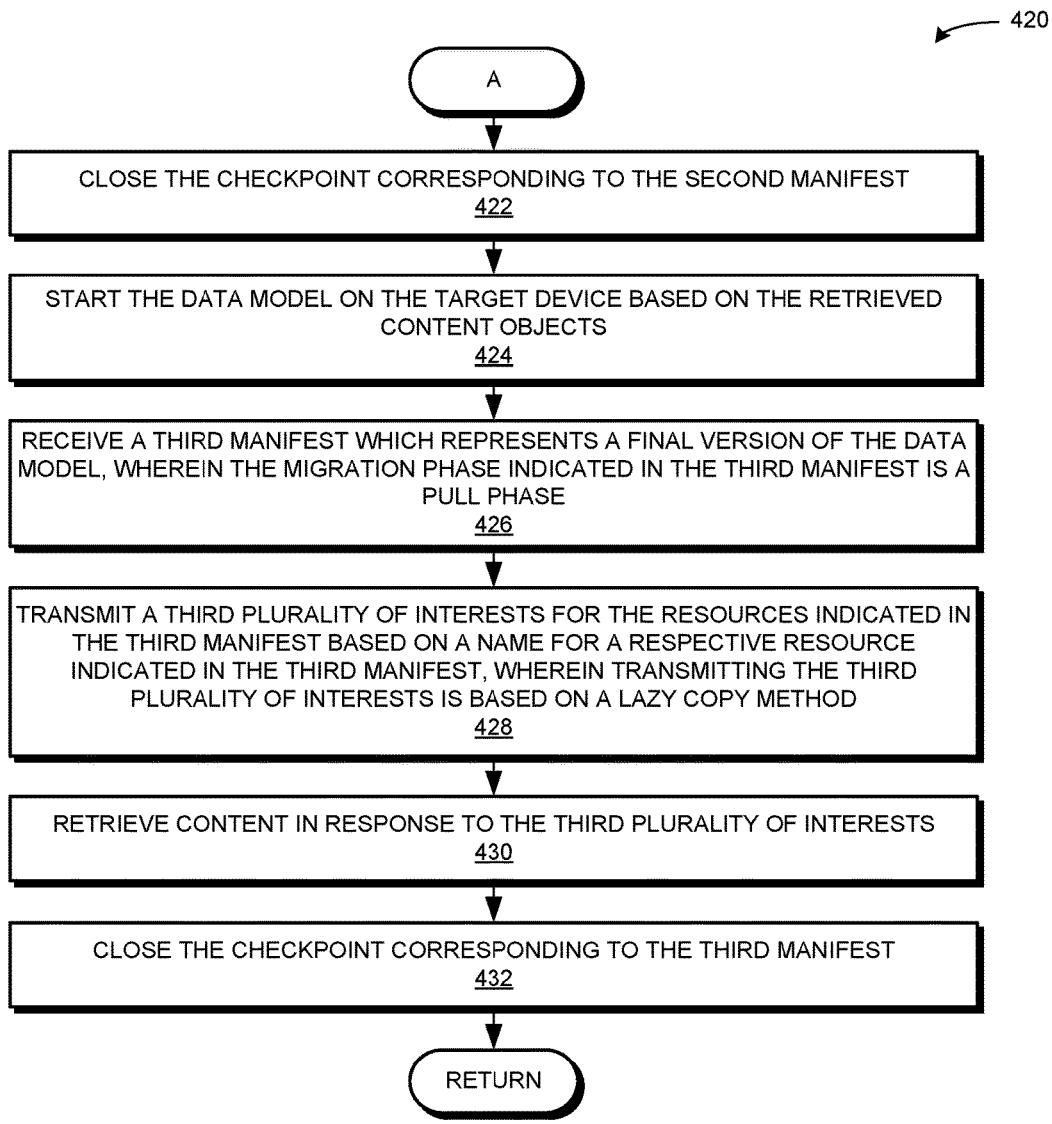
FIG. 4B presents a flow chart illustrating a method by a target device for facilitating process migration in a content centric network, in accordance with an embodiment of the present invention.

FIG. 4B presents a flow chart illustrating a method by a target device for facilitating process migration in a content centric network, in accordance with an embodiment of the present invention. During operation, the target device closes the checkpoint corresponding to the second manifest (operation 422, and as described below in relation to FIG. 5). The target device starts the data model on the target device based on the retrieved content objects (operation 424).

The target device receives a third manifest which represents a final version of the data model, wherein the migration phase indicated in the third manifest is a pull phase (operation 426). In some embodiments, such as a process migration based on a post-copy method, there may be more than one single "final" pull checkpoint manifest. The target device transmits a third plurality of interests for the resources indicated in the third manifest based on a name for a respective resource indicated in the third manifest, wherein transmitting the third plurality of interests is based on a policy of the target device (operation 428). The target device retrieves content in response to the third plurality of interests (operation 430). The target device closes the checkpoint corresponding to the third manifest (operation 432, and as described below in relation to FIG. 5).

Closing a Checkpoint

Figure 5:
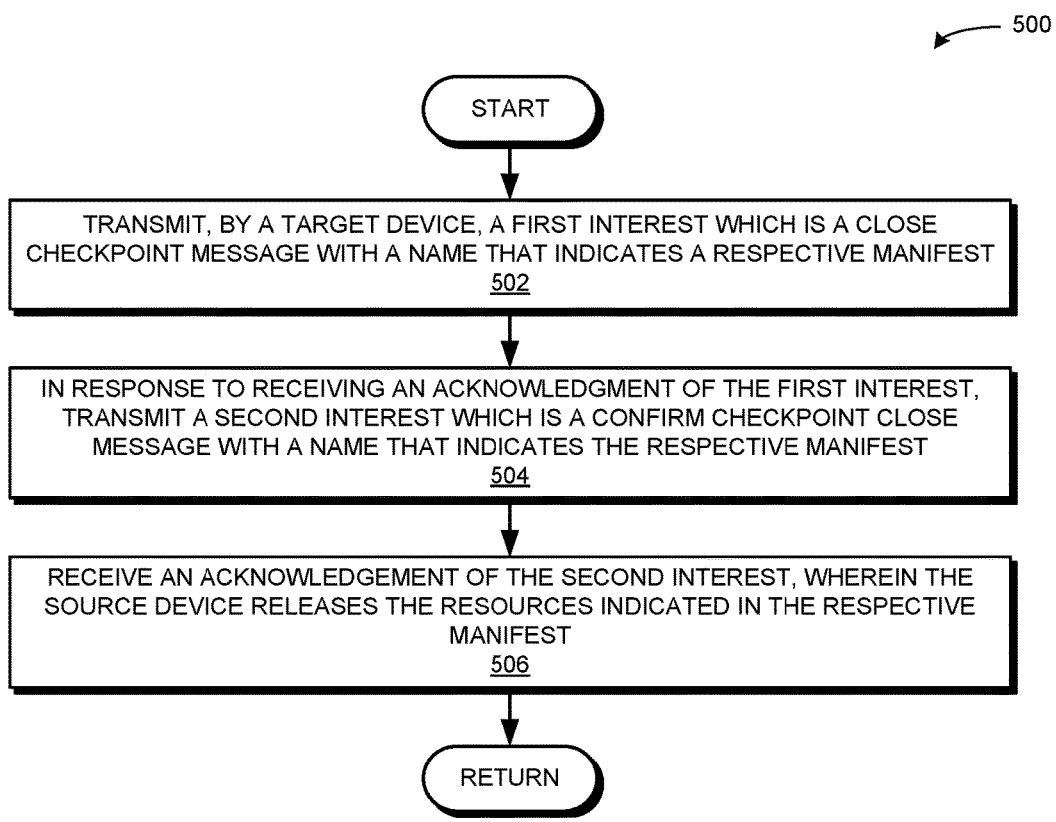
FIG. 5 presents a flow chart illustrating a method by a target device for closing a checkpoint during process migration in a content centric network, in accordance with an embodiment of the present invention.

FIG. 5 presents a flow chart 500 illustrating a method by a target device for closing a checkpoint during process migration in a content centric network, in accordance with an embodiment of the present invention. Closing a checkpoint may be initiated by a target device, and can occur after the target device finishes retrieving all data associated with a respective checkpoint manifest. During operation, a target device transmits a first interest which is a close checkpoint message with a name that indicates a respective manifest (operation 502). In response to receiving an acknowledgment of the first interest, the target device transmits a second interest which is a confirm checkpoint close message with a name that indicates the respective manifest (operation 504). The target device receives an acknowledgement of the second interest, wherein the source device releases the resources indicated in the respective manifest (operation 506).

Source Device Facilitates Process Migration Over a CCN

Figure 6A:
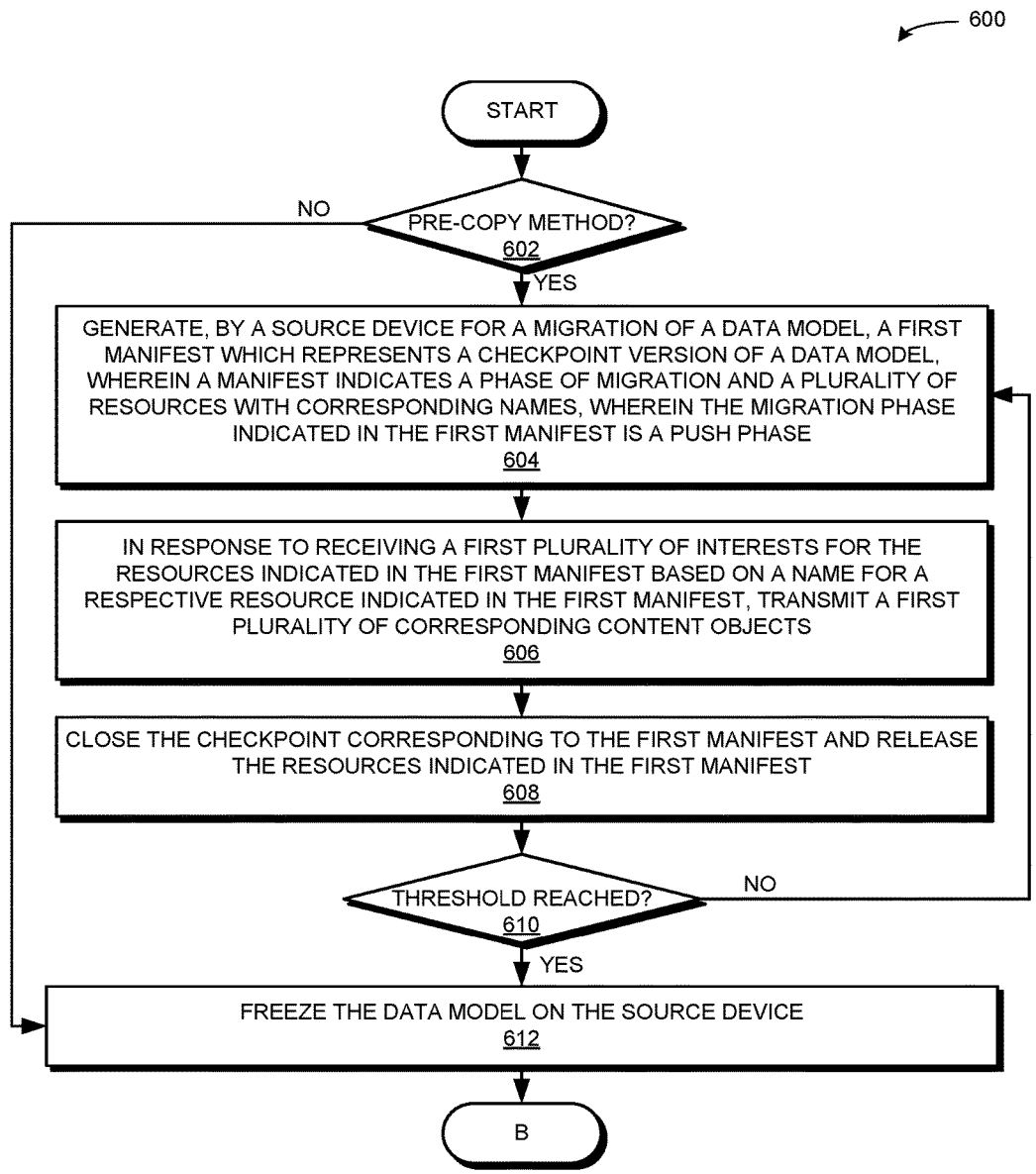
FIG. 6A presents a flow chart illustrating a method by a source device for facilitating process migration in a content centric network, in accordance with an embodiment of the present invention.

FIG. 6A presents a flow chart 600 illustrating a method by a source device for facilitating process migration in a content centric network, in accordance with an embodiment of the present invention. During operation, a source device determines whether a pre-copy method is used for a migration of a data model (decision 602). If the pre-copy method is not being used, and another method such as a post-copy method is being used, the operation continues at operation 612. If the pre-copy method is being used, the source device generates a first manifest which represents a checkpoint version of the data model, wherein a manifest indicates a phase of the migration and a plurality of resources with corresponding names, wherein the migration phase indicated in the first manifest is a push phase (operation 604). The first manifest can be a checkpoint manifest which indicates a unique version identifier for the data model. In response to receiving a first plurality of interests for the resources indicated in the first manifest based on a name for a respective resource indicated in the first manifest, the source device transmits a first plurality of corresponding content objects (operation 606). The source device closes the checkpoint corresponding to the first manifest and releases the resources indicated in the first manifest (operation 608, and as described below in relation to FIG. 5).

The source device determines whether a pre-determined threshold has been reached (decision 610) (i.e., marginal benefits result from transferring a checkpoint manifest, as in function 333 of FIG. 3A). If the threshold is not reached, the operation returns to operation 604, i.e., generating and transferring another checkpoint manifest to the target device. If the threshold is reached, the source device freezes the data model on the source device (as in function 334 of FIG. 3A), and the operation continues at Label B of FIG. 6B.

Figure 6B:
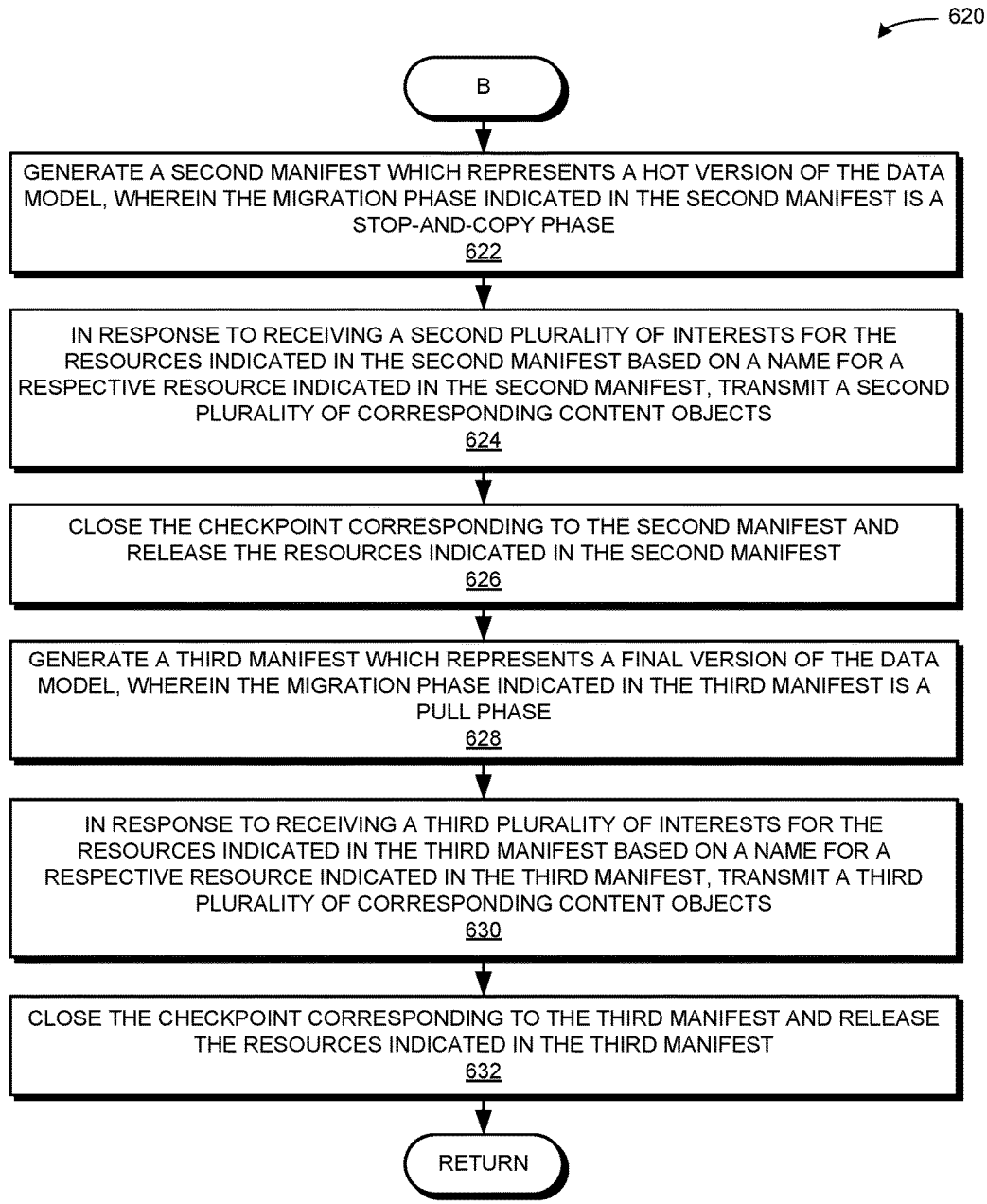
FIG. 6B presents a flow chart illustrating a method by a source device for facilitating process migration in a content centric network, in accordance with an embodiment of the present invention.

FIG. 6B presents a flow chart 620 illustrating a method by a source device for facilitating process migration in a content centric network, in accordance with an embodiment of the present invention. During operation, the source device generates a second manifest which represents a hot version of the data model, wherein the migration phase indicated in the second manifest is a stop-and-copy phase (operation 622). In response to receiving a second plurality of interests for the resources indicated in the second manifest based on a name for a respective resource indicated in the second manifest, the source device transmits a second plurality of corresponding content objects (operation 624). When the target receives the second plurality of corresponding content objects, the target device starts the data model on the target device (as in operation 424 of FIG. 4B). The source device closes the checkpoint corresponding to the second manifest and releases the resources indicated in the second manifest (operation 626, and as described below in relation to FIG. 5).

The source device generates a third manifest which represents a final version of the data model, wherein the migration phase indicated in the third manifest is a pull phase (operation 628). In some embodiments, including process migration based on a post-copy method, there may be more than one single "final" pull checkpoint manifest. In response to receiving a third plurality of interests for the resources indicated in the third manifest based on a name for a respective resource indicated in the third manifest, the source device transmits a third plurality of corresponding content objects (operation 630). The source device closes the checkpoint corresponding to the third manifest and releases the resources indicated in the third manifest (operation 632, and as described below in relation to FIG. 5).

Exemplary Computer System

Figure 7:
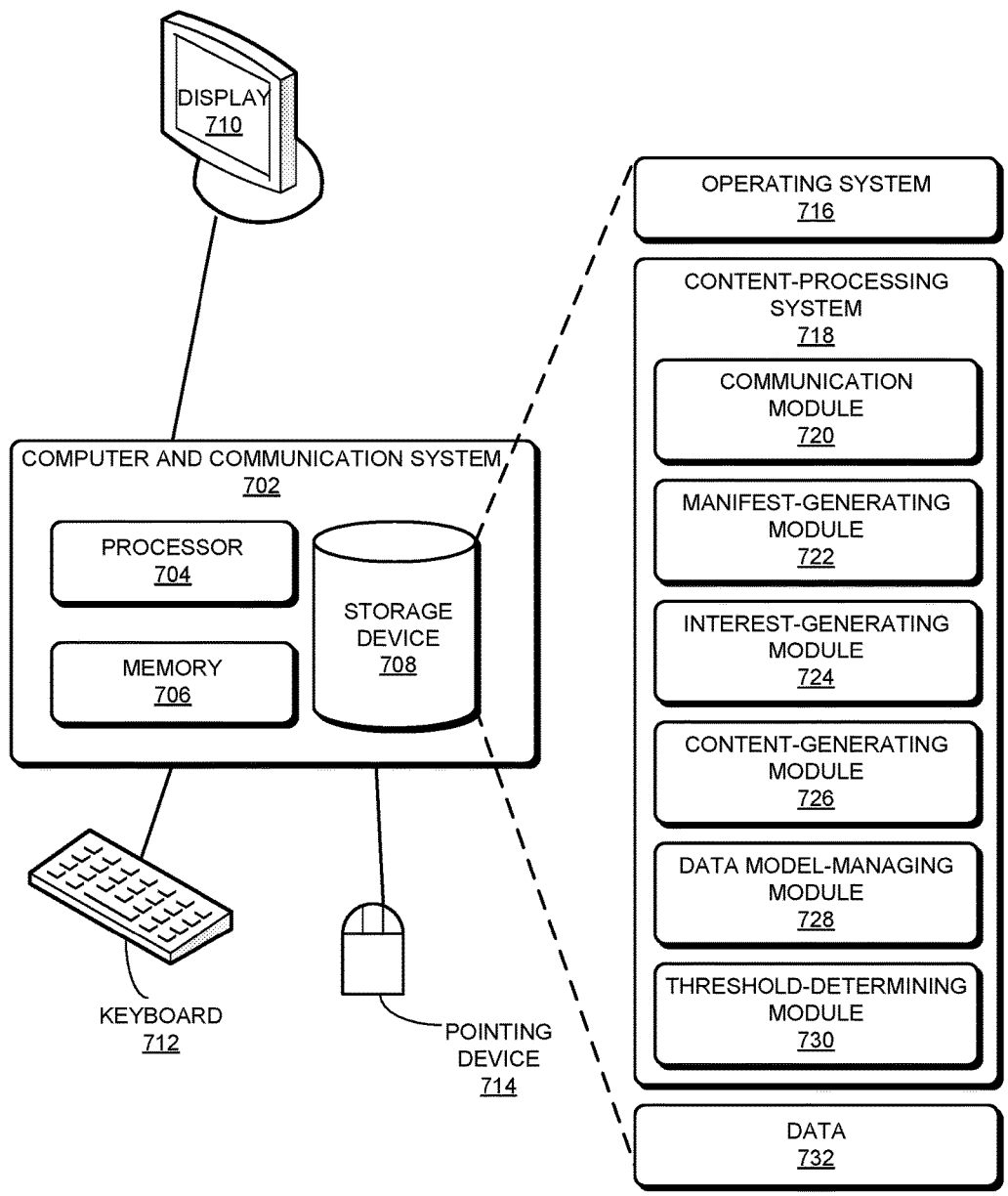
FIG. 7 illustrates an exemplary computer system that facilitates process migration in a content centric network, in accordance with an embodiment of the present invention.

FIG. 7 illustrates an exemplary computer system that facilitates process migration in a content centric network, in accordance with an embodiment of the present invention. Computer system 702 includes a processor 704, a memory 706, and a storage device 708. Computer system 702 can be a source device or a target device for a migration of a data model. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 730.

Content-processing system 718 can include instructions, which when executed by computer system 702, can cause computer system 702 to perform methods and/or processes described in this disclosure. Specifically, content-processing system 718 may include instructions for sending and/or receiving data packets to/from other network nodes across a computer network, such as a content centric network (communication module 720). A data packet can include an interest packet or a content object packet with a name which is an HSVLI that includes contiguous name components ordered from a most general level to a most specific level. The name can be a hash-based name, where the last name component is the hash value of the respective content object. A data packet can also include a manifest or an acknowledgment.

Further, content-processing system 718 can include instructions for generating a first interest for a first manifest which represents a version of the data model (interest-generating module 724). Content-processing system 718 can include instructions for, in response to receiving the first manifest, transmitting a first plurality of interests for the resources indicated in the first manifest based on a name for a respective resource indicated in the first manifest (communication module 720 and interest-generating module 724). Content-processing system 718 can include instructions for starting the data model on the system based on content objects retrieved in response to the first plurality of interests and other interests for other resources indicated in other manifests (data model-managing module 728).

Content-processing system 718 can include instructions for transmitting a first interest which is a close checkpoint message with a name that indicates a respective manifest (communication module 720 and interest-generating module 724). Content-processing system 718 can include instructions for, in response to receiving an acknowledgment of the first interest, transmitting a second interest which is a confirm checkpoint close message with a name that indicates the respective manifest (communication module 720 and interest-generating module 724). Content-processing system 718 can include instructions for receiving an acknowledgment of the second interest (communication module 720).

Content-processing system 718 can include instructions for generating a first manifest which represents a version of the data model (manifest-generating module 722). Content-processing system 718 can include instructions for, in response to receiving a first plurality of interests for the resources indicated in the first manifest based on a name for a respective resource indicated in the first manifest, transmitting a first plurality of corresponding content objects (communication module 720 and content-generating module 726). Content-processing system 718 can include instructions for, in response to reaching a predetermined threshold (threshold-determining module 730): freezing the data model on the system (data model-managing module 728); and generating a second manifest (manifest-generating module 722).

Data 732 can include any data that is required as input or that is generated as output by the methods and/or processes described in this disclosure. Specifically, data 732 can store at least: an interest; a content object; a name; a name that is an HSVLI that includes contiguous name components ordered from a most general level to a most specific level; a routable prefix or a name prefix that indicates one or more contiguous name components beginning from the most general level; a manifest; a data model; a version number or identifier of a data model; a phase of a migration; resources and corresponding names; a hash-based name; a hash value of data representing a resource; an indicator of a pre-copy technique, a post-copy technique, or any other migration technique; an indicator of a push, stop-and-copy, or pull phase; an instruction to freeze or start a data model; a virtual machine architecture; a manifest which represents a collection of data including resources, features, and hash values; a configuration file or link; a predetermined marginal threshold; a checkpoint version of a data model; a message; an acknowledgment of a message; a close checkpoint message; a confirm checkpoint close message; and an indicator of a manifest.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating a migration of a data model indicating resources, the system comprising:
a processor; and
a storage device storing instructions that when executed by the processor cause the processor to perform a method, the method comprising:
generating a first interest for a first manifest which represents a version of the data model, wherein a manifest indicates a phase of the migration and a plurality of resources with corresponding names;
in response to receiving the first manifest, transmitting a first plurality of interests for the resources indicated in the first manifest based on a name for a respective resource indicated in the first manifest;
receiving a second manifest, wherein the migration phase indicated in the second manifest is a stop-and-copy phase;
transmitting a second plurality of interests for the resources indicated in the second manifest based on a name for a respective resource indicated in the second manifest; and
starting the data model on the system based on content objects retrieved in response to the first and second plurality of interests,
thereby facilitating the migration of the data model over a content centric network from a source device to the system.

2. The computer system of claim 1, wherein generating the first interest, receiving the first manifest, and transmitting the first plurality of interests are in response to determining a pre-copy method for the migration of the data model, and
wherein receiving the second manifest is in response to retrieving content indicated in the first manifest and one or more checkpoint manifests.

3. The computer system of claim 2, wherein a respective checkpoint manifest indicates a unique version identifier for the data model,
wherein the migration phase indicated in the first manifest and a respective checkpoint manifest is a push phase, and
wherein the second manifest represents a hot version of the data model.

4. The computer system of claim 1, wherein the data model comprises an architecture for a virtual machine, and wherein the resources are resources of the virtual machine.

5. The computer system of claim 1, wherein a name is a hierarchically structured variable length identifier that includes contiguous name components ordered from a most general level to a most specific level,
wherein the name for a respective resource indicated in a manifest is a hash-based name which includes a hash value for data representing the respective resource, and
wherein the hash-based name for the respective resource allows the system to obtain the respective resource from any device that stores a content object with a hash value that matches the hash value included in the hash-based name,
thereby facilitating de-duplication of data in the data model.

6. The computer system of claim 1, wherein receiving the second manifest is further in response to the source device determining that a predetermined marginal threshold is reached and freezing the data model on the source device.

7. The computer system of claim 1, wherein the method further comprises:
receiving a third manifest which represents a final version of the data model, wherein the migration phase indicated in the third manifest is a pull phase; and
transmitting a third plurality of interests for the resources indicated in the third manifest based on a name for a respective resource indicated in the third manifest, wherein transmitting the third plurality of interests is based on a policy of the system.

8. The computer system of claim 1, wherein the method further comprises:
transmitting a first interest which is a close checkpoint message with a name that indicates a respective manifest;
in response to receiving an acknowledgment of the first interest, transmitting a second interest which is a confirm checkpoint close message with a name that indicates the respective manifest; and
receiving an acknowledgment of the second interest, wherein the source device releases the resources indicated in the respective manifest.

9. A computer system for facilitating a migration of a data model indicating resources, the system comprising:
a processor; and
a storage device storing instructions that when executed by the processor cause the processor to perform a method, the method comprising:
generating a first manifest which represents a version of the data model, wherein a manifest indicates a phase of the migration and a plurality of resources with corresponding names;
in response to receiving a first plurality of interests for the resources indicated in the first manifest based on a name for a respective resource indicated in the first manifest, transmitting a first plurality of corresponding content objects;
in response to reaching a predetermined threshold:
freezing the data model on the system; and
generating a second manifest, wherein the migration phase indicated in the second manifest is a stop-and-copy phase; and
in response to receiving a second plurality of interests for the resources indicated in the second manifest based on a name for a respective resource indicated in the second manifest, transmitting a second plurality of corresponding content objects,
thereby facilitating the migration of the data model over a content centric network from the system to a target device.

10. The computer system of claim 9, wherein generating the first manifest, receiving the first plurality of interests, and transmitting the first plurality of content objects are in response to determining a pre-copy method for the migration of the data model, and wherein the migration phase indicated in the first manifest is a push phase.

11. The computer system of claim 9, wherein the data model comprises an architecture for a virtual machine, and wherein the resources are resources of the virtual machine.

12. The computer system of claim 9, wherein a name is a hierarchically structured variable length identifier that includes contiguous name components ordered from a most general level to a most specific level,
wherein the name for a respective resource indicated in a manifest is a hash-based name which includes a hash value for data representing the respective resource, and
wherein the hash-based name for the respective resource allows the target device to obtain the respective resource from any device that stores a content object with a hash value that matches the hash value included in the hash-based name,
thereby facilitating de-duplication of data in the data model.

13. The computer system of claim 9, wherein the method further comprises:
generating one or more checkpoint manifests, wherein a respective checkpoint manifest indicates a unique version identifier for the data model, wherein the migration phase indicated in the respective checkpoint manifest is a push phase, and
wherein the second manifest represents a hot version of the data model.

14. The computer system of claim 9, wherein the method further comprises:
generating a third manifest which represents a final version of the data model, wherein the migration phase of the third manifest indicates a pull phase; and
in response to receiving a third plurality of interests for the resources indicated in the third manifest based on a name for a respective resource indicated in the third manifest, transmitting a third plurality of corresponding content objects.

15. The computer system of claim 9, wherein the method further comprises:
in response to receiving a first interest which is a close checkpoint message with a name that indicates a respective manifest, transmitting an acknowledgment of the first interest; and
in response to receiving a second interest which is a confirm checkpoint close message with a name that indicates the respective manifest:
transmitting an acknowledgment of the second interest; and
releasing the resources indicated in the respective manifest.

16. A computer-implemented method for facilitating a migration of a data model indicating resources, the method comprising:
generating, by a target device, a first interest for a first manifest which represents a version of the data model, wherein a manifest indicates a phase of the migration and a plurality of resources with corresponding names;
in response to receiving the first manifest, transmitting a first plurality of interests for the resources indicated in the first manifest based on a name for a respective resource indicated in the first manifest;
receiving a second manifest, wherein the migration phase indicated in the second manifest is a stop-and-copy phase;
transmitting a second plurality of interests for the resources indicated in the second manifest based on a name for a respective resource indicated in the second manifest; and
starting the data model on the system based on content objects retrieved in response to the first and second plurality of interests,
thereby facilitating the migration of the data model over a content centric network from a source device to the target device.

17. The method of claim 16, wherein generating the first interest, receiving the first manifest, and transmitting the first plurality of interests are in response to determining a pre-copy method for the migration of the data model,
wherein the migration phase indicated in the first manifest is a push phase,
wherein receiving the second manifest is in response to retrieving content indicated in one or more checkpoint manifests,
wherein a respective checkpoint manifest indicates a unique version identifier for the data model, wherein the migration phase indicated in the respective checkpoint manifest is a push phase, and
wherein the second manifest represents a hot version of the data model.

18. The method of claim 16, wherein the data model comprises an architecture for a virtual machine, and wherein the resources are resources of the virtual machine.

19. The method of claim 16, wherein a name is a hierarchically structured variable length identifier that includes contiguous name components ordered from a most general level to a most specific level,
wherein the name for a respective resource indicated in a manifest is a hash-based name which includes a hash value for data representing the respective resource, and
wherein the hash-based name for the respective resource allows the system to obtain the respective resource from any device that stores a content object with a hash value that matches the hash value included in the hash-based name,
thereby facilitating de-duplication of data in the data model.

20. The method of claim 16, further comprising:
receiving a third manifest which represents a final version of the data model, wherein the migration phase indicated in the third manifest is a pull phase; and
transmitting a third plurality of interests for the resources indicated in the third manifest based on a name for a respective resource indicated in the third manifest, wherein transmitting the third plurality of interests is based on a policy of the target device.

* * * * *